United States Patent
Masi et al.

(10) Patent No.: US 9,751,959 B2
(45) Date of Patent: Sep. 5, 2017

(54) CATALYST PRECURSOR AND CATALYST FOR THE HIGH-TEMPERATURE (CO)POLYMERIZATION OF ALPHA-OLEFIN

(75) Inventors: Francesco Masi, Sant'Angelo Lodigiano-Lodi (IT); Francesco Menconi, Massa Macinaia (IT); Giuseppe Conti, Padenghe Sul Garda (IT); Mario Polesello, Ferrara (IT); Alberto Zanellato, Castel d'Ario Mantova (IT)

(73) Assignee: Versalis S.P.A. (IT)

( * ) Notice: Subject to any disclaimer, the term of this patent is extended or adjusted under 35 U.S.C. 154(b) by 409 days.

(21) Appl. No.: 13/995,391

(22) PCT Filed: Dec. 20, 2011

(86) PCT No.: PCT/EP2011/073367
§ 371 (c)(1),
(2), (4) Date: Aug. 7, 2013

(87) PCT Pub. No.: WO2012/084920
PCT Pub. Date: Jun. 28, 2012

(65) Prior Publication Data
US 2013/0317184 A1    Nov. 28, 2013

(30) Foreign Application Priority Data
Dec. 20, 2010  (IT) .............................. MI2010A2332

(51) Int. Cl.
C08F 4/16      (2006.01)
C08F 10/02     (2006.01)
C08F 210/16    (2006.01)

(52) U.S. Cl.
CPC ................ *C08F 4/16* (2013.01); *C08F 10/02* (2013.01); *C08F 210/16* (2013.01)

(58) Field of Classification Search
None
See application file for complete search history.

(56) References Cited

U.S. PATENT DOCUMENTS

| | | |
|---|---|---|
| 4,497,906 A | 2/1985 | Hanji et al. |
| 4,663,404 A | 5/1987 | Invernizzi et al. |
| 5,332,707 A * | 7/1994 | Karayannis et al. ... C08F 10/00 502/113 |

FOREIGN PATENT DOCUMENTS

WO          00/58368 A1    10/2000

* cited by examiner

*Primary Examiner* — Catherine S Branch
(74) *Attorney, Agent, or Firm* — Tarolli, Sundheim, Covell & Tummino LLP

(57) ABSTRACT

A precursor for the formation of catalysts for the (co) polymerization of α-olefins, comprising titanium, magnesium, at least one metal selected from hafnium and zirconium, aluminum and chlorine, obtained with a process comprising treatment with a siloxane compound. Said solid precursor, used in combination with a suitable co-catalyst in high-temperature (co)polymerization processes of α-olefins, shows an improved productivity, a high incorporation of co-monomers in the copolymerization of ethylene and an increased thermal stability with respect to the systems so far in use.

21 Claims, No Drawings

CATALYST PRECURSOR AND CATALYST FOR THE HIGH-TEMPERATURE (CO)POLYMERIZATION OF ALPHA-OLEFIN

RELATED APPLICATION

This application is a National Phase filing of PCT/EP2011/073367, filed Dec. 20, 2011, and claims priority to Italian Application No. MI2010A002332, filed Dec. 20, 2010, the subject matter of which are incorporated herein by reference in their entirety.

The present invention relates to a catalyst precursor for the (co)polymerization of alpha-olefins, and particularly ethylene, in high-temperature processes.

In particular, the present invention relates to a precursor of a catalyst of the Ziegler-Natta type having a high thermal stability, and consequently suitable for high-temperature (co)polymerization processes of alpha-olefins, obtaining particularly high productivities.

It is well-known that alpha-olefins, and in particular ethylene, can be polymerized in low, medium or high pressure processes with catalysts of the Ziegler-Natta (ZN) type to give substantially linear polymers or polymers with controlled branching, having high molecular weights. These catalysts generally consist of a solid precursor based on one or more elements of the fourth to sixth groups of the Periodic Table, combined with an alkyl derivative or a hydride of the elements of groups 1, 2 or 13, especially an aluminium alkyl. ZN catalysts comprising a solid containing a transition metal (generally titanium), a bivalent metal (generally magnesium), a halogen (generally chlorine), and optionally an electron-donor compound, are particularly known. These solid components, combined with a suitable cocatalyst with reducing properties, usually an alkyl-derivative of aluminium, form catalysts active in the polymerization or copolymerization [hereinafter (co)polymerization] of ethylene, in processes carried out at low temperatures and pressures. U.S. Pat. No. 3,642,746, for example, describes a catalytic solid obtained by contact of a compound of a transition metal with the halide of a bivalent metal treated with an electron-donor compound. According to patent GB 1,401,708, the solid precursor is obtained by interaction of a magnesium chloride with a non-halogenated compound of a transition metal and an aluminium halide. U.S. Pat. No. 3,901,863 and U.S. Pat. No. 4,292,200 describe catalysts obtained by putting a non-halogenated magnesium compound in contact with a non-halogenated compound of a transition metal and with an aluminium halide.

U.S. Pat. No. 4,843,049 and EP 243,327 describe a catalyst obtained from a solid precursor which contains titanium, magnesium, aluminium, chlorine and alkoxyl groups, highly active in (co)polymerization processes of ethylene carried out at a low temperature and pressure, with the suspension technique, but also in high-pressure and high-temperature processes in vessel or tubular reactors respectively. Said solid precursor was prepared by reacting an active carrier of semi-crystalline magnesium chloride obtained by the spray-drying of an ethanol solution of $MgCl_2$ with titanium tetra-alkoxide or titanium tetrachloride and subsequently with an aluminium alkyl chloride.

It is well-known that the (co)polymerization of ethylene in solution at high temperatures (160-260° C.) offers considerable advantages with respect to polymerization processes in suspension at low temperatures (50-90° C.):

i) the rapid separation of the polymer from the solvent by fast evaporation (flash) of the latter, exploiting the reduction in pressure and high thermal content of the mixture leaving the reactor;

ii) the possibility of producing granules directly from the molten polymer removed from the reactor;

iii) exploitation of the reaction heat to sustain the high-temperature conditions, rather than its removal by cooling.

In particular, with reference to point iii), for adiabatic processes in which the overall enthalpic balance, consisting of the sensitive polymerization heat and that supplied externally, is kept constant during the whole polymerization reaction, it is particularly advantageous to use the catalyst at the maximum possible temperatures compatible with the macromolecular properties of the resins produced. This guarantees a considerable energy saving deriving from the lesser quantity of external heat provided, necessary for the fluidification/finishing of the polymeric mass obtained.

In processes which control the molecular weight of the copolymerization reactions of ethylene with higher alpha-olefins, however, the growing chain transfer mechanisms towards the comonomers (for example 1-butene, 1-hexene or 1-octene) are particularly critical, increasingly so as the reaction temperature becomes higher.

Furthermore, under the above conditions, the thermal stability of the catalyst is equally as critical, and in particular maintaining the structure of the active sites for most of the residence time inside the reactor.

It is known that catalysts suitable for operating under low-temperature conditions provide modest catalytic performances at high temperatures in terms of a lowering of both the catalytic yields and molecular weights and it is consequently not possible to use them as such in high-temperature processes. Furthermore, the residence times in the reactor in these processes are very short (in the order of a few minutes) and they cannot be increased due to the short life of the catalyst caused by very rapid deactivation processes under these conditions. The catalysts used must therefore reach their maximum activity in extremely rapid times and induction times are not tolerated.

Various attempts have been made to improve the yields and properties of the polymers or copolymers of alpha-olefins obtained from high-temperature processes, using catalysts based on mixtures of transition metals. EP 177,189 and EP 146,507, for example, both describe the preparation and use of catalysts of the ZN type consisting of titanium and hafnium for obtaining polyethylene with a wide molecular weight distribution (bimodal). The process for the preparation of these catalysts consists in the introduction of titanium and hafnium in two separate steps. Patent EP 523,785 discloses that the introduction of carboxylate groups directly bound to the magnesium and transition metal in the catalyst precursor, allow catalytic solids to be obtained, which represent an improvement with respect to the known art in terms of catalytic activity and quality of the polymers obtained, in both (co)polymerization processes of ethylene and other alpha-olefins carried out at low pressure and temperature, and also carried out at high pressure and temperature and in solution. Published international patent application WO00/58368 (of the Applicant) describes a particular bimetallic carboxylate catalyst of the ZN type, supported on magnesium chloride which allows the production of polymers and (co)polymers of alpha-olefins with high molecular weights also in high-temperature processes.

Also in the case of this latter catalyst, however, in spite of its enhancing activity with respect to the known art, it is clear the rapid degradation of the catalytic performances in terms of yield and certain properties of the polymers obtained, in particular the average molecular weights, under the higher temperature conditions (T>220° C.) and longer residence times which are created especially in processes effected adiabatically.

It is generally believed that the drop in performances is due to both heat degradation, [J. P. Machon, R. Hermant, J. P. Houzeaux, *J. Polym. Sci.* 52, 107 (1975); J. A. Delgado Oyague, J. L. Hernandez-Vaquero Alvarez, *Plastics and Rubber Processing and Applications* 8, 3 (1987)], and also to the deactivation of the active surface sites of Ti(III) caused by the excessive alkylating and reducing power of the aluminium trialkyls forming the cocatalyst at high temperatures [J. P. Machon, R. Hermant, J. P. Houzeaux, *J. Polym. Sci.* 52, 107 (1975)], with the formation of only slightly active Ti(II) species.

In order to solve the above problems and drawbacks and further improve production processes of polyolefins, the Applicant has now found a new group of catalysts, obtained by selectively modifying the catalytically active sites of the above high-yield catalysts comprising carboxylates, by means of particular organic compounds with an intermediate polarity, whereby it is possible to obtain much higher catalytic performances with respect to the known art in terms of productivity and stability with time in high-temperature polymerization processes, both in solution and under high pressure.

The present invention is based on the observation that certain siloxane-based polar organic compounds, already known for their capacity of regulating the stereotacticity in polymerization reactions of alpha-olefins with traditional catalysts, surprisingly also show the capacity of inhibiting said degradation and deactivation mechanisms in catalysts of high-temperature processes, particularly in the case of the (co)polymerization of ethylene, allowing, with the same temperature, the production of resins having a higher molecular weight. Consequently, in adiabatic industrial processes, for producing resins having the same molecular weight with respect to existing catalysis, this leads to the possibility of increasing the reaction temperature by about 4-5° C., with a productivity gain, with the same configuration and quality of the polymer obtained, which can be estimated as being around 10-15%.

A first object of the present invention therefore relates to a catalyst precursor for the (co)polymerization of alpha-olefins, comprising titanium, magnesium, aluminium, chlorine and at least one metal M selected from hafnium and zirconium, preferably hafnium, characterized in that it is obtained by means of a process comprising the following steps:

(i) heating a mixture in a liquid hydrocarbon medium comprising a magnesium chloride, a compound of titanium, a compound of said metal M, a carboxylic acid R—COOH, wherein R is an organic group having from 2 to 30, preferably from 5 to 15 carbon atoms, in such quantities as to respect the following atomic or molar ratio ranges:
M/Ti=0.2-5.0; Mg/Ti=3.0-20.0; R—COOH/(Mg+M) = 1-8 at a temperature ranging from 50 to 200° C., preferably from 60 to 130° C., for at least one minute, preferably for a time ranging from 0.5 to 4 hours, separating the possible solid residue remaining undissolved, to obtain a solution;

(ii) adding to the solution obtained in step (i), an aluminium alkyl chloride having the following general formula (I):

$$AlR'_nCl_{(3-n)} \quad (I)$$

wherein: R' is a linear or branched alkyl radical, containing from 1 to 20 carbon atoms, and "n" is a decimal number having values ranging from 0.5 to 2.5, preferably from 0.9 to 2.1, in an amount sufficient for precipitating in the form of a solid compound at least 70%, preferably at least 80%, of the metals Mg, M and Ti present in said solution, and heating the mixture thus obtained to a temperature ranging from 40 to 130° C., preferably from 60 to 110° C., for a time ranging from 5 to 240 minutes, preferably from 40 to 150 minutes, to obtain a solid precipitate comprising Mg, M, Al and Cl in atomic ratios with respect to the Ti within the following ranges:
M/Ti=0.2-5.0; Mg/Ti=3.0-15.0; Al/Ti=0.1-4.0; Cl/Ti=15.0-60.0;

(iii) separating the solid precipitate thus formed from the residual liquid solution;

(iv) putting said solid precipitate obtained in step (iii) in contact with a siloxane compound A, having from 2 to 40 carbon atoms and from 1 to 15 silicon atoms, comprising at least one siloxane group selected from the following formulae:

O—Si—C and Si—O—Si, in such an amount that the atomic ratio Si/Ti between the Si atoms in the siloxane compound A and the Ti atoms in the solid precipitate, is higher than or equal to 0.1, preferably ranging from 0.2 to 2.0, to obtain said catalyst precursor.

The term "(co)polymerization", as used in the present description and claims with reference to alpha-olefins, refers to both the homo-polymerization of an alpha-olefin, for example of ethylene to form high-density crystalline polyethylene, or propylene to form polypropylene, and also the copolymerization of an alpha-olefin with at least one different unsaturated compound copolymerizable with it (obviously including a different alpha-olefin), for example, the co-polymerization of ethylene with propylene and ethylidene-norbornene to form a cross-linkable elastomeric polyethylene (EPDM), or the co-polymerization of ethylene with 1-butene to form linear low-density polyethylene (LLDPE).

For greater simplicity, in the present description and claims, the terms "mole" and "molar ratio" are used with reference to both compounds consisting of molecules and also with reference to atoms and ions, disregarding for the latter the terms gram-atom or atomic ratio, even if scientifically more correct.

According to a preferred aspect of the present invention, said catalyst precursor is a solid composed for at least 85% by weight, preferably from 90 to 100%, more preferably from 95 to 100% by weight, of titanium, magnesium, said metal M, aluminium and chlorine. In addition to these elements, the precursor can contain smaller amounts of other constituents, it being possible for there to be up to 15% by weight, preferably up to 10% by weight, more preferably less than 5% by weight, of a non-metallic residue, prevalently consisting of carboxylate anions (preferably in a quantity greater than or equal to 50% by weight with respect to the total non-metallic residue) introduced with the solubilization treatment with carboxylic acid in step (i) of the preparation process of the precursor. The remaining part of the non-metallic residue of the precursor according to the present invention comprises other counter-anions of the compounds used as reagents in the preparation process, for example, alcoholates, bromide, fluoride, phosphate groups, alkyl residues, without causing any particular disadvantage. It is also possible to have the presence, preferably not higher than 0.5% by weight, of impurities of other metals present in the reagents used for the preparation of the solid catalyst precursor, without significantly modifying the advantageous properties of the same. Precursors having the smallest possible amount of impurities of other metals, particularly not higher than 0.1% by weight, are preferable however.

The quantity of titanium contained in the catalyst precursor of the present invention preferably does not exceed 10% by weight, and more preferably ranges from 1 to 5% by weight with respect to the total weight of the solid. Titanium contents higher than 10% by weight do not offer any further advantage in terms of catalytic activity subsequently obtained, presumably due to the fact that the additional titanium is present in the solid in inactive form or unavailable for interacting with the olefin to be polymerized.

In the process for preparing the precursor according to the present invention, the liquid hydrocarbon medium used in step (i) can be any saturated aliphatic or cycloaliphatic hydrocarbon, or an aromatic hydrocarbon, whose physical state is liquid at the temperatures at which said step (i) is carried out. For this purpose, aliphatic or cycloaliphatic hydrocarbons having from 6 to 12 carbon atoms, such as for example, hexane, heptane, octane, nonane, decane, undecane, dodecane, cyclohexane, decalin, tetralin, mixtures of naphthenes with a boiling point ranging from 90 to 150° C., are preferred. Limited quantities of polar organic liquids such as alcohols, ethers, ketones, however, can be occasionally present in the reaction mixture, deriving from the same reagents in the mixture of step (i), for example alcohols or ethers present in the magnesium chloride, if obtained according to the known spray-drying methods.

In the mixture of step (i), the compounds of titanium, magnesium, hafnium and/or zirconium are suitably selected by an expert in the field from those soluble in the hydrocarbon solvent or suitable for being dissolved, at least for the most part, by the action of the carboxylic acid in step (i) itself. The choice of the most suitable compounds for this purpose can be effected on the basis of the solubility parameters of each compound, if known, or with simple preliminary solubility tests in the presence of the carboxylic acid selected.

The magnesium chloride can be $MgCl_2$ in any crystalline or amorphous form, preferably in powder or microgranular form (average dimension≤500 μm), including the magnesium dichloride obtained by rapid evaporation of its concentrated ethanol solutions, according to the known techniques, for example by spray-drying. Other Mg chlorides suitable for forming the mixture of step (i) are mixed magnesium chlorides, in which there is at least one chlorine atom for each Mg atom, and the remaining counter-ions can be other halogens, for example Br or F, or an alcoholate group, for example ethylate, or another organic or inorganic anion.

Non-limiting examples of compounds of titanium, hafnium and zirconium, both soluble and insoluble, suitable for forming the mixture of step (i), are chlorides, bromides, alcoholates, hydrides, β-diketonates, β-acylesters, amides, carbonates, carboxylates, phosphates, compounds mixed with said counter-ions and mixtures of said groups of compounds. Particularly preferred are halides, especially chlorides, and halides combined with alcoholates. The titanium is preferably introduced into the mixture as a tetravalent ion, i.e. as a Ti(IV) compound, more preferably Ti tetrachloride or Ti tetra-alcoholate in which the alcoholate group has from 1 to 5 carbon atoms.

In a preferred embodiment of the present invention, magnesium, hafnium and/or zirconium are introduced into the mixture of step (i) as chlorides in the form of granular solids or powder. Particularly suitable titanium compounds, in addition to Ti tetrachloride and mixed chlorides, are alcoholates such as Ti tetraethylate or tetrabutyl ate.

According to the present invention, at least 50% by weight, usually at least 70% by weight, with respect to the total weight of the metal compounds in the mixture of step (i), is generally insoluble in the hydrocarbon liquid medium preselected. These compounds are preferably mixed with the hydrocarbon liquid with an overall concentration of the metals (both soluble and insoluble) ranging from 0.05 to 3.0, more preferably ranging from 0.1 to 1.0 moles/l.

The mixture of step (i) can be prepared by the simple introduction, under stirring, into the hydrocarbon liquid, of the metallic compounds and carboxylic acid, the former preferably in granular or powder form. The order in which these compounds are introduced into the mixture with each other and with the hydrocarbon liquid is not particularly critical for the purposes of the present invention, but the carboxylic acid R—COOH is preferably added last to facilitate the control of any possible partial reactions already underway during the mixing. The temperature during the formation of the mixture is conveniently maintained at a value lower than or equal to 40° C. Room temperature and atmospheric pressure are preferred. The carboxylic acid can possibly be introduced into the reaction mixture of step (i) in consecutive portions, also during the dissolution reaction.

Any other formation method of the mixture of these compounds is in any case included in the scope of the present invention.

The relative quantities of the various compounds included in the mixture of step (i) are selected in relation to the desired atomic ratios between the elements in the solid precursor obtained at the end of the process. These atomic ratios are not necessarily identical to those of the metals in the corresponding compounds in step (i), as, according to the preparation process of the precursor of the present invention, shifts are possible in relation to the specific conditions adopted, especially as a result of the lower quantities of compounds remaining undissolved and separated at the end of step (i) or which have not precipitated in step (ii) or (iii), which can normally reach up to 30% more or less, without significantly jeopardizing the expected properties of the catalyst precursor obtained at the end of the preparation process. An expert in the field is capable, in the usual preliminary preparation operations of the process, of verifying the entity of these shifts and consequently optimizing the ratios of the reagents in relation to the desired atomic ratios between the elements in the final product. Preferred atomic ratios between the elements in step (i) of the process of the present invention are the following:

M/Ti=0.5-4.0; Mg/Ti=3.0-16.0; R—COOH/(Mg+M)= 1.5-5

The carboxylic acid having the formula RCOOH used in step (i) for the partial or complete dissolution of the solids present therein, preferably has a relatively high number of carbon atoms in the chain, ranging from 5 to 15, to favour dissolution in a liquid medium of the hydrocarbon type. Carboxylic acids with a number of carbon atoms higher than 31 are difficult to find on the market and do not offer particular advantages with respect to those having up to 30 atoms in the chain. The group R in the formula of carboxylic acid can be any hydrocarbon radical having up to 30 carbon atoms, including hydrocarbon radicals substituted with inert groups, especially halogens such as fluorine and chlorine. More preferably, R is an aliphatic or cycloaliphatic radical having from 6 to 12 carbon atoms.

Non-limiting examples of said group R according to the present invention are:
- a linear alkyl containing at least 5 carbon atoms; for example the groups n-hexyl, n-octyl, n-decyl, n-undecyl;
- a branched alkyl which can be represented by the following general formula:

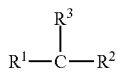

wherein $R^1$ is hydrogen or alkyl and $R^2$ and $R^3$ are alkyl, wherein the sum of the carbon atoms is equal to at least 4 and up to 12; for example isoamyl, 1-ethylhexyl groups, branched aliphatic radicals of versatic acids;
- an alkyl carrying a branching on the secondary carbon atom in β with respect to the carbon atom of the carboxyl and having from 4 to 12 carbon atoms; for example in 3-ethyl pentanoic and citronellic acid;
- a cycloalkyl, aryl, alkylcycloalkyl or alkylaryl having the general formula:

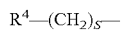

wherein $R^4$ represents the cycloalkyl or aryl portion, having from 5 to 10 carbon atoms, for example the cyclohexyl, benzyl, phenyl, p-ethylphenyl group and "s" is an integer varying from 0 to 10.

Mixtures of carboxylic acids included in said formula R—COOH, such as for example, versatic acids, are also equally included in the definition of carboxylic acid according to the present invention.

The carboxylic acid can be added in portions or in continuous to the heterogeneous mixture of step (i), or it can be totally introduced into the mixture before the heating of the same is initiated. The amount of carboxylic acid depends, each time, on the nature and quantity of insoluble compounds present in the mixture of step (i), and also on the quantity of insoluble residue which an expert considers tolerable at the end of step (i). The latter is suitably lower than or equal to 30%, preferably lower than or equal to 10% by weight with respect to the weight of metallic compounds of the mixture which are insoluble as such at room temperature in the liquid hydrocarbon medium. The molar ratio RCOOH/(Mg+M) preferably ranges from 1.5 to 5.0, more preferably from 2.0 to 4.0.

An expert in the field can advantageously use molar ratios RCOOH/(Mg+M) which are not excessively high, also allowing the formation of a solid residue within the above limits at the end of step (i), in order to limit the quantity of aluminium alkyl chloride necessary in the subsequent step (ii) of the present process for the preparation of the precursor.

The above carboxylic acid can be added to the mixture in pure form, or diluted with an inert solvent, preferably the same hydrocarbon liquid as the mixture of step (i), for example to favour the mixing in the case of a solid acid, or for a more accurate dosage when small quantities are used.

Step (i) of the process of the present invention is preferably carried out at a temperature ranging from 60 to 130° C., even more preferably from 70 to 110° C. A possible cooling of the mixture after the partial dissolution of the insoluble compounds is included in the process operations within the scope of step (i).

During step (i), a mixture is formed in which the carboxylic acid is at least partly combined with the metallic compounds present forming mixed carboxylates in solution. The residual solid which can possibly remain undissolved at the end, can contain one or more of the metals initially introduced into step (i). When the magnesium chloride in step (i) is $MgCl_2$, it has been found that this residue, if present, substantially consists of magnesium dichloride.

Step (i) is preferably carried out so that there are no significant flows of material towards the outside, for example in a closed container or under reflux conditions of the solvent. If hydrochloric acid develops during the reaction, due to the presence of chlorides in the above metals, this is consequently kept dissolved in the reaction mixture.

At the end of step (i), the residual solid possibly present can be conveniently separated from the liquid before the latter is treated with an aluminium alkyl chloride in accordance with the subsequent step (ii). The separation can be effected, preferably after cooling the mixture to a temperature ranging from 20 to 40° C., by any of the known techniques suitable for the purpose, such as for example, filtration, decanting, centrifugation. In a preferred embodiment, the possible separation of the insoluble residue is effected in suitable closed containers, maintaining the pressure and temperature at such values as to limit the release of vapours as much as possible.

In step (ii) of the process for preparing the catalyst according to the present invention, an aluminium alkyl chloride having formula (I) is reacted with the solution obtained in accordance with the previous step (i), possibly after separation of the undissolved solid, in order to form a precipitate in the form of a microparticulate (powder) or granular solid. According to the experience of the Applicant, a suspended solid is formed during step (ii), prevalently consisting of Mg and M (preferably Hf) chlorides, whereas the titanium prevalently precipitates during the subsequent heating step, mostly in the form of $TiCl_3$. In this way, a solid precipitate is obtained.

The use of an aluminium alkyl chloride having formula (I) as precipitant reagent allows the contemporaneous precipitation of the elements Mg and M in the form of mixed chlorides, or mixed chlorides-carboxylates, in addition to the reduction and precipitation of the titanium, so that this is present in the solid prevalently in oxidation state +3.

Aluminium alkyl chlorides having formula (I) are known and widely used in the field of the polymerization of olefins. Preferred aluminium alkyl chlorides are compounds having formula (I) wherein R' is a linear or branched aliphatic radical having from 2 to 8 carbon atoms. The index "n" in formula (I) preferably ranges from 0.9 to 2.1, more preferably from 1 to 2, extremes included. Typical examples of these compounds are ethyl aluminium dichloride, diethyl aluminium chloride, ethyl aluminium sesquichloride, isobutyl aluminium dichloride, dioctyl aluminium chloride. Aluminium alkyl chlorides having non-integer decimal values "n" can be obtained, according to the known art, by mixing, in suitable proportions, aluminium chlorides and aluminium trialkyls and/or the respective mixed alkyl chlorides having "n" equal to 1 and 2.

The aluminium alkyl chloride having formula (I) can be added as such, or, preferably, in the form of a solution in a hydrocarbon selected from those used for the preparation of the mixture of step (i). The addition of the aluminium alkyl chloride is preferably effected by maintaining the reaction mixture under stirring under suitable temperature conditions and monitoring the precipitation of the solid in suspension according to any of the known techniques, for example, by collecting samples and analysis, or by direct determination with optical methods or other methods suitable for the purpose, until the desired precipitation level is reached.

According to a preferred embodiment, an expert in the field can predetermine with normal routine tests, for each specific composition of the solution of step (i), the amount of aluminium alkyl chloride which is sufficient for quantitatively precipitating the metals Mg, M and Ti during step (ii) of the process of the present invention. It has also been found, on the basis of repeated experience, that the amount of aluminium alkyl chloride which is generally adequate for obtaining the precipitation, with the formation of the desired solid, is at least equal to the double, preferably from 3 to 5 times, of the moles of carboxylic acid used in step (i). More preferably, the amount of aluminium alkyl chloride which is added in step (ii) ranges from 1.2 to 2 times that calculated according to the formula:

$$(AlR'_nCl_{(3-n)} \text{moles}) = 1/(3-n) \cdot [(4 \cdot Ti \text{ moles} + 2 \cdot Mg \text{ moles} + 4 \cdot M \text{ moles} - Cl \text{ moles})_{in\ step\ (i)} + 2 (RCOOH \text{ moles})_{in\ step\ (i)}].$$

Higher quantities of aluminium alkyl chloride do not further improve the properties of the precursor and catalyst subsequently obtained therewith, but cause an excessive consumption of aluminium alkyl and lead to the necessity of repeated washings of the precipitate. This calculation method is particularly preferred when the compounds used in step (i) are essentially selected form alcoholates and chlorides, which are usually commercial products easily available on the market.

In the addition phase of aluminium alkyl chloride in step (ii), it is preferable to operate at a temperature ranging from 20 to 45° C. for at time which, depending on the temperature preselected, can vary from 0.5 to 8 hours. In a further preferred embodiment, the aluminium alkyl chloride is added to the solution coming from step (i) operating so that the difference between the minimum and maximum temperature in the addition phase does not exceed 15° C. This can be obtained by controlling the addition rate or flow of the aluminium alkyl chloride (or a solution thereof in a hydrocarbon solvent), so that the heat developed by the reaction can be adequately removed or absorbed, for example with exchangers or cooling jackets.

In accordance with step (ii) of the preparation process, after the addition of the aluminium alkyl chloride, the suspension obtained is heated and maintained at a temperature ranging from 40 to 130° C., more preferably from 60 to 110° C., for a time of 5 to 240 minutes, preferably from 40 to 150 minutes, to consolidate the solid precipitate obtained. The heating phase and temperature maintenance of step (ii) is preferably effected in a closed vessel, at the equilibrium pressure reached by the system, which normally ranges from 100 to 500 KPa.

An expert in the field can optionally effect the present preparation process by adding a part, preferably up to 30% with respect to the total, of aluminium alkyl chloride, during the heating of the suspension.

At the end of step (ii), a solid precipitate is obtained, comprising Mg, M, Al and Cl in atomic ratios with respect to Ti within the following ranges:
M/Ti=0.2-5.0; Mg/Ti=3.0-15.0; Al/Ti=0.1-4.0; Cl/Ti=15.0-60.0

The precipitate is in the form of microparticulate (powder) or, by operating under the above preferred conditions in the addition phase of the aluminium alkyl chloride having formula (I), it is in granular form, whose particles typically have a relatively narrow Gaussian distribution, with an average diameter ranging from 2 to 15 µm, preferably from 3 to 12 µm and a distribution of the particle dimensions having 80% of the particles within a range of 1 to 30 µm, preferably from 2 to 20 µm. This represents a further advantageous aspect of the preparation process of the catalyst of the present invention, as it allows a solid to be obtained at the end of step (ii), with an average dimension of the granules and distribution ideal for an optimum separation of the mother liquor and subsequent washing, and also for effecting the subsequent operations, transportation and storage of the solids obtained.

The solid precipitate obtained in step (ii) is separated from the reaction liquid (containing residues of aluminium alkyl, carboxylate and other impurities), in accordance with step (iii) of the present preparation process, usually with the normal liquid-solid separation means, excluding evaporation of the solvent, which would leave traces of undesired residues in the product obtained. Decanting, filtration or centrifugation can be typically used, or a combination of these methods, preferably effecting intermediate washings with a hydrocarbon liquid, until a minimum molar concentration of aluminium, preferably lower than 1.5 mM (1.5 $10^{-3}$ moles/liter), more preferably 0.5 mM, is obtained in the liquid separated. A particularly preferred separation method consists of one or more decanting steps followed by one or more filtration steps and washing with hydrocarbons. For this purpose, the solid precursor is left to settle up to a volume of the suspension lower than 50%, preferably 30%, of the initial volume, with a concentration of the solid of 200 g/l or higher. The clarified liquid in the upper part is removed and the suspension brought back to a volume similar to the initial value or even greater, by adding the necessary amount of a liquid hydrocarbon, the same or different from that of the reaction. The sedimentation and separation steps as described above are possibly repeated once or twice, subsequently proceeding with the filtration of the granular solid and effecting consecutive washings with hydrocarbons until the desired threshold of aluminium impurities is reached in the washing solvent. In this process, it is particularly advantageous to avail of a solid precipitate with a high particle-size, according to one of the preferred aspects of the present invention, for conveniently effecting the sedimentation operations.

Said solid precipitate can be obtained, at the end of the above step (iii), in dry granular form, and possibly preserved in an inert atmosphere for subsequent uses, or, preferably, it is obtained in the form of a concentrated suspension (slurry) in a hydrocarbon liquid, preferably the same as the last washing at the end of the separation process by decanting and/or filtration, and thus preserved or immediately fed to step (iv) of the present process for the preparation of the precursor. The solid in slurry conveniently has concentrations ranging from 5 to 500 g/l, preferably from 10 to 100 g/l, suspended in aliphatic hydrocarbons having from 6 to 14, preferably from 8 to 12, carbon atoms. The improved morphology and greater density of the precipitate obtained under the preferred controlled temperature conditions of step (ii), allow said concentrated suspensions to be prepared by decanting in times of a few hours.

In a preferred embodiment of the present invention the various constituents are present in the solid precipitate in atomic ratios with respect to the titanium within the following ranges:
M/Ti=0.5-4.0; Mg/Ti=6.0-13.0; Al/Ti=0.2-2.0; Cl/Ti=18.0-50.0.

The solid precipitate obtained at the end of step (iii) can be used as such for the formation of a polymerization catalyst of olefins by combination with a cocatalyst based on aluminum trialkyls, according to what is described in the art, for example in published European patent application EP 1171479, even without achieving the surprising results obtainable with the catalyst according to the present invention.

In step (iv) of the present preparation process, said solid precipitate is put in contact, preferably in suspension in a liquid hydrocarbon as indicated above, with a suitable amount of said siloxane compound A.

The siloxane compound A according to the present invention, comprises at least 1, preferably from 1 to 10 O atoms, more preferably from 1 to 5 O atoms. More preferably, all the O atoms of the compound A are bound to at least one Si atom.

The siloxane compound A is preferably selected from those included in the following formulae (II) and (III):

(II)

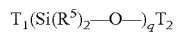
(III)

wherein
each R" is independently a linear, cyclic or branched alkyl group, having from 1 to 10 carbon atoms, optionally halogenated or an aryl group having from 6 to 10 carbon atoms, optionally halogenated, or an alkyl silyl group having the formula —SiR'"$_3$, and is preferably an alkyl having from 1 to 6 carbon atoms, optionally chlorinated or fluorinated;

each R'" is independently H, a halogen, preferably chlorine or an alkyl or aryl group included in the definition of the previous R", and is preferably an alkyl group having from 1 to 6 carbon atoms, optionally chlorinated or fluorinated;

each $R^5$ is independently H, a halogen, preferably chlorine, or an alkyl or aryl group included in the definition of the previous R", or an alkoxyl or aryloxy groups having the formula —OR", wherein R" is as previously defined and is preferably an alkyl group having from 1 to 6 carbon atoms, $T_1$ can have any of the meanings of $R^5$, and is preferably an alkyl or alkoxyl group having from 1 to 6 carbon atoms, optionally chlorinated or fluorinated;

$T_2$ can have any of the meanings of R", and is preferably an alkyl group having from 1 to 6 carbon atoms, optionally chlorinated or fluorinated;

p is an integer ranging from 0 to 3, preferably from 1 to 3, extremes included;

q is an integer ranging from 2 to 15, preferably from 2 to 5, extremes included.

Particularly preferred siloxane compounds are compounds having formula (II), wherein R" and R'" are both an alkyl group having from 1 to 5 carbon atoms and p ranges from 1 to 2.

Non-limiting examples of siloxane compounds A which can be used in step (iv) of the preparation process according to the present invention are: tetraethoxysilane, tetrabutoxysilane, dichlorodiethoxysilane, dimethyldimethoxysilane, isobutylisopropyldimethoxysilane, diisopropyldimethoxysilane, cyclopentyl-isobutyldimethoxysilane, dicyclohexyldimethoxysilane, phenyltriethoxysilane, diphenyldimethoxysilane, dibutoxysilane (SiH$_2$(OC$_4$H$_9$)$_2$), hexamethyldisiloxane (CH$_3$)$_3$Si—O—Si(CH$_3$)$_3$.

The siloxane compounds which can be used with the present invention form a well-known group of compounds and can be easily obtained by means of known synthesis methods of organic chemistry. Many of these compounds are commercially available.

In step (iv), the mixture obtained by putting the solid precipitate in contact with the compound A is preferably maintained in suspension in a liquid hydrocarbon, at a temperature ranging from −10 to 120° C., more preferably from 10 to 80° C., even more preferably from 20 to 50° C. The concentration of solid preferably ranges from 1 to 50% by weight with respect to the weight of the suspension.

The contact time between the siloxane compound A and the solid precipitate is not particularly critical. The mixture is conveniently left under stirring for a time of at least 1 minute, preferably from 1 to 120 minutes, more preferably from 10 to 60 minutes.

The quantity of siloxane compound A put in contact with the solid precipitate in step (iv) is more preferably such that the Si/Ti ratio ranges from 0.2 to 1.0. Ratios equal to or lower than 0.7 are preferable when the atomic ratio O/Si in the compound A is 2 or higher.

During step (iv) of the preparation process of the precursor, the solid precipitate interacts with the siloxane compound A according to a non-definable stoichiometry, presumably by modifying the electronic and coordinative structure of at least a part of the metals contained in the solid, in particular Ti, with the result of considerably improving the resistance to the deactivation of the catalyst in high-temperature polymerization processes. In particular, a significant increase in the average molecular weight of the polyolefins produced is observed, especially of copolymers of ethylene, with respect to catalysts based on the solid obtained at the end of step (iii). This behaviour is attributed to the formation of active polymerization sites which are thermally more stable and less sensitive to the chain transfer reaction.

According to a variant of the preparation process of the catalyst precursor, step (iv) can be carried out in two or more consecutive phases, in each of which a portion of the siloxane compound A is interacted with the solid in suspension, with or without removal of the liquid present in the previous phase. These partial reaction phases are not necessarily carried out under the same conditions, provided they are included in those specified above.

The precursor thus produced can be subsequently obtained in solid form, by separating the liquid of the suspension, containing the possible excess of siloxane compound, using one of the method described in the previous step (iii), preferably by means of decanting and/or filtration, possibly followed by washing steps with a solvent. At the end, the catalyst precursor can be obtained in the form of a dry solid product, by evaporation of the residual liquid, or it can be obtained in the form of a concentrated suspension in a liquid hydrocarbon, analogously to what is specified above for the solid precipitate of step (iii).

According to a particular aspect of the present invention, the Applicant has found, however, that it is not necessary to separate the siloxane compound possibly non-reacted in step (iv) of the preparation process, from the suspension of the precursor, to obtain the desired excellent catalytic performances. Consequently, according to a preferred aspect of the present invention, the catalyst precursor is obtained in the form of a suspension in the contact liquid in step (iv), comprising the liquid hydrocarbon and the possible residual siloxane compound A remaining in solution. Said suspension can be fed directly to the formation process of the catalyst and/or to the polymerization process, together with the co-catalyst.

In a further variant, also included in the scope of the present invention, a suspension of the solid residue obtained in step (iii) and the desired quantity of siloxane compound A are fed directly to the polymerization process (reactor), together with the cocatalyst.

All the process operations previously described, especially those relating to steps (ii) to (iv), are conveniently carried out in a controlled and inert atmosphere, for example of nitrogen or argon, considering the sensitivity of the precursor and catalytic solid to the air and humidity. The catalyst precursor of the present invention is conveniently used within a few days, preferably within a few hours of its preparation.

It has been found that the reaction with the siloxane compound (A) in step (iv) for obtaining the solid catalyst precursor, does not significantly modify the morphology and particle distribution of the solid precipitate obtained at the end of step (iii).

In the precursor, preferably at least 60%, more preferably at least 80% of the titanium is in the oxidation state +3.

The catalyst precursor obtained according to the present invention therefore comprises at least two metals of group 4 of the periodic table, and for this reason it is conventionally indicated with the term "bimetallic". It can be put in contact with a co-catalyst selected from hydrides or organometallic compounds of metals of groups 1, 2 or 13 of the periodic table, in particular aluminium trialkyls, according to the known catalysis techniques of the Ziegler-Natta type, for obtaining a catalyst for the (co)polymerization of alpha-olefins, and particularly ethylene, having a high activity and selectivity, in addition to a prolonged operative duration especially in high-temperature processes. The Applicant has in fact found that these new catalysts allow much higher yields to be obtained from the very start of the polymerization in (co)polymerization processes carried out at temperatures ranging from 160 to 260° C., in addition to providing high productivities thanks to their longer duration (i.e. deactivation in longer times) in high-temperature polymerizations.

Suitable co-catalysts which can be used in a combination with the solid precursor of the present invention in (co) polymerization processes of alpha-olefins, are those normally described in the art for the preparation of catalysts of the Ziegler-Natta type and previously mentioned. Preferred co-catalysts are aluminium alkyls and alkyl halides (particularly chlorides) containing from 1 to 10, preferably from 2 to 6, carbon atoms in each alkyl radical bound to Al. Among these, aluminium trialkyls such as aluminium triethyl, aluminium tri-n-butyl, aluminium triisobutyl and aluminium trihexyl are particularly preferred.

In the catalysts of the present invention, the atomic ratio between aluminium (in the cocatalyst) and titanium (in the solid precursor) generally ranges from 1:1 to 500:1 and preferably from 2:1 to 100:1, more preferably from 10:1 to 100:1, in relation to the type of co-catalyst and particular polymerization process adopted.

Said (co)polymerization catalyst is formed according to the known methods, by contact between the solid precursor and the cocatalyst, preferably in a suitable liquid medium, usually a hydrocarbon, which can also consist of, or contain, one or more of the olefins to be polymerized. Depending on the characteristics of the polymerization process in which the catalyst obtained according to the present invention is to be used, this can be prepared separately and subsequently introduced into the polymerization reactor, or it can be prepared in situ, by feeding the constituents separately into the polymerization reactor. The temperature at which said constituents are put in contact for the formation of the catalyst is not particularly critical and can vary within a wide range, preferably from 0° C. to the temperature of use in the polymerization process. The formation of the catalyst is normally almost immediate already at room temperature, although, in certain cases, contact between the components can be maintained from 10 seconds to 30 minutes, depending on the temperature, before initiating the polymerization.

One or more additives or further components can possibly be added to the above catalyst according to the present invention, to obtain a catalytic system suitable for satisfying specific requisites in practice, analogously with what is known in the art. The catalytic systems thus obtained should be considered as being included in the scope of the present invention. Additives or components which can be included in the preparation and/or formulation of the catalyst of the present invention are inert liquids, such as, for example, aliphatic and/or aromatic hydrocarbons, suitable for maintaining the catalyst in suspension, in addition to small quantities of weakly coordinating additives (Lewis bases) selected, for example, from non-polymerizable olefins, ethers, tertiary amines and alcohols, other halogenating agents such as halogenated hydrocarbons, preferably chlorinates, and again all other possible components normally used in the art for the preparation of traditional catalysts for the (co)polymerization of ethylene and other alpha-olefins.

Even if particularly effective in high-temperature polymerization processes, with respect to the catalysts known in the art, the catalyst described and claimed herein can be advantageously used in all known (co)polymerization processes of alpha-olefins, both in continuous and batchwise, in one or more steps, such as, for example, low-pressure (0.1-1.0 MPa), medium-pressure (1.0-10 MPa) or high-pressure (10-150 MPa) processes, at temperatures ranging from 20 to 300° C., optionally in the presence of an inert diluent. Hydrogen can be conveniently used as molecular-weight regulator.

These processes can be carried out in solution or suspension in a liquid diluent normally consisting of saturated aliphatic or cycloaliphatic hydrocarbons having from 3 to 12, preferably from 6 to 10, carbon atoms, but which can also consist of a monomer, as for example, in the known copolymerization process of ethylene and propylene in liquid propylene. The quantity of catalyst introduced into the polymerization mixture is preferably selected so that the concentration of titanium is within the range of $10^{-4}$ to $10^{-8}$ moles/liter.

The alpha-olefins which can be used in the above processes are preferably those containing from 2 to 20, more preferably from 2 to 8, carbon atoms, aliphatic, cycloaliphatic or aromatic, such as ethylene, propylene, 1-butene, 4-methylpent-1-ene, 1-hexene and 1-octene, ethylidene norbornene, styrene. Ethylene is particularly preferred, with reference to both homo-polymerization and also co-polymerization processes, in which ethylene is in any case the prevalent monomer as it represents over 50% by weight of the polymer obtained.

In particular, the catalyst of the present invention can be used in the preparation of polymers and copolymers of ethylene. It can be used with excellent results in the polymerization of ethylene to give linear polyethylene and in the copolymerization of ethylene with propylene or higher alpha-olefins, preferably having from 4 to 10 carbon atoms, to give copolymers having different characteristics in relation to the specific polymerization conditions and quantity and structure of the same alpha-olefin. Linear polyethylenes with densities ranging from 0.880 to 0.950 g/cc, can be obtained for example, and with average molecular weights ranging from 100,000 to 2,000,000. The alpha-olefins preferably used as co-monomers of ethylene in the production of low or medium density linear polyethylene (known with the abbreviations ULDPE, VLDPE and LLDPE, depending on the density), are 1-butene, 1-hexene and 1-octene. In these copolymerization processes, especially those carried out at a high temperature, the catalyst of the present invention exhibits an advantageously high capacity of incorporating alpha-olefins, allowing said linear polyethylenes to be obtained in the presence of smaller quantities of comonomer with respect to the known processes.

The catalyst of the present invention can also be conveniently used in copolymerization processes of ethylene and propylene to give saturated vulcanizable elastomeric copolymers with the use of peroxides, extremely resistant to aging and degradation, or in the terpolymerization of ethylene, propylene and a non-conjugated diene having from 5 to 20 carbon atoms, to obtain vulcanizable rubbers of the EPDM type.

Examples of non-conjugated dienes typically used for preparing these copolymers are 5-ethylidene-2-norbornene (ENB), 1,4-hexadiene and 1,6-octadiene.

The solid catalyst of the present invention can have a particularly advantageous use in (co)polymerization processes of alpha-olefins, and especially ethylene, in solution at a high temperature. These processes are normally carried out at temperatures ranging from 130 to 300° C., preferably from 160 to 260° C., and at pressures ranging from 1 to 25 MPa, preferably from 5 to 20 MPa, in the presence of an inert liquid capable of maintaining the polymer which is formed, in solution, at the process temperature. In this way, a homogeneous reaction mixture is formed (except for the catalyst), together with a process which is easily controllable and flexible, which allows short residence times and high productivities. Preferred liquids, for both their solvating characteristics of polyolefins, and also for the relatively low toxicity, are aliphatic or cycloaliphatic hydrocarbons having from 6 to 10 carbon atoms, such as, heptane, decane, cyclohexane and decalin. The polymer is then separated by precipitation or by devolatilization of the solvent. For general information on known processes of this type, reference can be made, among the numerous publications available, to "Encyclopedia of Polymer Science and Engineering", $2^{nd}$ edition (1986), volume 6, pages 471-472, John Wiley & Sons Ed.

As polyolefins, especially if semi-crystalline, have a low solubility in solvents, the use of relatively high temperatures, preferably from 160 to 260° C., is critical for effecting these processes. The processes are carried out in adiabatic reactors, or isotherms, depending on the technology adopted. It is known, however, that in polymerization processes at such high temperatures, the average molecular weight of the polymer obtained is significantly lowered, leading to Melt Flow Index (MFI) levels which are so high as to be unacceptable for normal transformation processes. The catalysts generally used in processes in solution are based on vanadium. They are not capable however of producing polyolefins with satisfactory molecular weights for a wide range of applications, thus limiting the diffusion of the process itself, in spite of the above advantages. Furthermore, there are margins for further improvement also in relation to the activity of these catalysts. The known catalysts of the Ziegler-Natta type based on titanium, normally used in suspension processes, on the other hand, are also less suitable than the previous catalysts when used at a high temperature, producing polyethylenes with particularly low molecular weights and unsuitable for most of the normal applications.

The catalyst according to the present invention unexpectedly allows high average molecular weights of the ethylene polymers and copolymers, to be obtained, also operating at the above high temperatures, obtaining much lower MFI values with respect to traditional catalysts used under the same process conditions. In this respect, it has been found that polymerization processes with a high productivity effected with this catalyst at temperatures higher than 180° C., have allowed polymers to be obtained with a Melt Flow Index, at 2.16 kg, lower than 0.5 dg/min, whereas polyethylenes having a similar composition obtained with a process under the same conditions showed MFI values higher than 0.7 dg/min.

The present invention, in its numerous aspects, is more specifically illustrated by the following examples, which are provided for purely illustrative purposes, without in any way forming or being considered a limitation of the overall scope of the invention itself.

EXAMPLES

Reagents and Materials

The reagents and materials used in the following examples of the invention, and their possible pretreatment, are indicated in the following list; the supplier is indicated in brackets Titanium tetrachloride (Aldrich, 99.9%): distilled n-hexane Synthesis (Synthsol LP6 purity 95%) anhydrified on mixed bed columns with molecular sieves 4A/13× n-Decane Synthesis (Synthsol LP10, 95%): anhydrified on mixed bed columns with molecular sieves 4A/13×

Triisobutylaluminium (TIBAL) (Chemtura pure): used as such

Triethylaluminium (TEA) (Chemtura, pure): used as such

Diethylaluminiumchloride (DEAC) (Chemtura, pure): used as such

Diisobutylaluminiumchloride (DIBAC): 97%, Chemtura

Isobutylaluminiumdichloride (IBADIC): 99%, Chemtura 1-hexene: 97%, Aldrich, distilled on calcium hydride 1-octene: 98%, Aldrich, distilled on calcium hydride Ethylene: Air Liquide grade 4.5, Purity≥99.9%

Anhydrous Magnesium Chloride (Cezus-Areva): >99%, grade T.202, used as such

Titanium Tetrabutylate (ACROS): purity >99%, used as such

Hafnium Tetrachloride (ACROS): >95%, grade 101, used as such 2-ethylhexanoic acid: (BASF): anhydrified on molecular sieves 4A Diisopropyldimethoxysilane (Eurenor® 5021, Chemtura), used as such.

Elemental Analysis a) Determination of Mg, Al, Hf and Ti.

For the determination of the quantity by weight of the metals Mg, Al, Hf and Ti, in the precipitates and solid precursors of the present invention, an aliquot weighed exactly, operating in a dry-box under a flow of nitrogen, of about 30-50 mg of sample, was placed in a platinum crucible of about 30 ml, together with a mixture 0.25 ml of $H_2SO_4$ at 96% and 1 ml of $HNO_3$ at 70%. The crucible was then heated on a plate increasing the temperature until the appearance of white sulphuric fumes (about 200° C.). The mixture thus obtained was cooled to room temperature, 1 ml of HNO₃ at 70% was added and the mixture was then brought again to the appearance of fumes. After repeating the sequence a further two times, a limpid, almost colourless solution was obtained. 1 ml of HNO₃ and about 15 ml of water were then added without heat, heating to 80° C. for about 30 minutes. The sample thus prepared was diluted with water having a MilliQ purity up to a weight of about 50 g, weighed exactly, to obtain a solution on which instrumental analytic determination was effected using a Perkin Elmer OPTIMA3200RL ICP-OES (optical detection plasma) spectrometer, for comparison with solutions at a known concentration. For this purpose, for each analyte, a calibration line within the range of 0-10 ppm was prepared, measuring solutions with a known titre obtained by dilution by weight of certified solutions.

The solution of the sample prepared as described above was diluted again by weight so as to obtain concentrations close to those used as reference, before effecting spectrophotometric analysis. All the samples were prepared in duplicate. The results were considered acceptable if the single data of the tests in duplicate did not differ by more than 2% relative with respect to their average value.

b) Chlorine Determination

Approximately 30-50 mg of sample were weighed exactly in 100 ml glasses in a dry-box under a stream of nitrogen. 2 g of Na₂CO₃ were added and 50 ml of MilliQ water were added, outside the dry-box. The mixture was brought to boiling point on a plate under magnetic stirring for about 30 minutes. It was left to cool, diluted H₂SO₄ 1/5 was added until the reaction became acid and the mixture was titrated with AgNO₃ 0.1N with a potentiometer titrimeter.

Granulometric Analysis

The determination of the average particle size and distribution of the catalytic solids was effected with the optical method using a MALVERN MASTERSIZER2000 instrument.

Characterization of the polymers and copolymers The Melt Flow Index, MFI of the polymers was measured according to the standard ASTM D-1238E, with a weight of 2.16 kg. The so-called shear sensitivity (SS) was also determined with the same equipment, as a ratio between MFI with a weight of 21.6 kg and MFI with a weight of 2.16 kg.

The density of the polymeric products obtained was measured by means of a gradient column, according to the method ASTM D1505-68.

The average molecular weights of the olefinic polymers Mn and Mw and the relative distribution MWD, were determined by means of Gel-Permeation Chromatography (GPC), using a WATERS 150-CV chromatograph with a Waters differential refractometer as detector, eluting with 1,2,4-trichlorobenzene (stabilized with Santonox) at 135° C. A set of μ-Styragel HT columns (Waters) were used of which three with a pore dimension of 10³, 10⁴, 10⁵ Å respectively, and two with a pore dimension of 10⁶ Å, establishing a flow-rate of the eluent of 1 ml/min. The data were acquired and processed by means of Maxima 820 software version 3.30 (Millipore); the calculation of the number average molecular weights (Mn) and weight average molecular weights (Mw) was effected by means of universal calibration, selecting standards of polystyrene with molecular weight within the range of 6,500,000-2,000, for the calibration.

Example 1

The following products are charged in order into a 1,000 ml Buchi glass reactor containing 200 ml of n-decane: 3.20 g (33.6 mmoles) of MgCl₂, 0.96 g (2.82 mmoles) of Ti(n-OBu)₄ and 1.18 g (3.68 mmoles) of HfCl₄.

16.12 g (111.8 mmoles, 17.8 ml) of 2-ethylhexanoic acid (EEA), equal to a molar ratio EEA/(Mg+ Hf)=3, are subsequently added, at room temperature, slowly and under stirring.

The suspension thus obtained is heated to 90° C. and maintained at this temperature for 30 minutes in a closed vessel. A slightly opalescent light yellow-green-coloured solution is obtained, which is then filtered under heat on a filtering septum, leaving a residue of 0.67 g (7.03 mmoles) of MgCl₂ equal to 20.9% of the initial MgCl₂. A solution of 28.8 g (185.8 mmoles) of isobutylaluminium dichloride (IBADIC) in 92 ml of n-decane is added dropwise to the limpid solution thus obtained, cooled to room temperature. During the addition of IBADIC, the temperature of the reaction mixture does not exceed 40° C. The ratio between the chlorine atoms in the IBADIC and alkoxide and carboxylic groups initially introduced is equal to 3. The reaction mixture thus formed is heated to 80° C. and kept at this temperature for 2 hours.

The pink-brown-coloured solid precipitate obtained is separated from the mother liquor by decanting, subsequently washed with three aliquots, each of 200 ml, of n-hexane, and dried under vacuum at room temperature.

4.35 grams of solid precipitate (PREP 1) are obtained, having the following composition (weight % with respect to the total weight of the solid):

titanium: 2.95% by weight
magnesium: 12.09% by weight
hafnium: 13.70% by weight
aluminium: 2.85% by weight
chlorine: 62.82% by weight
zirconium: 0.2% by weight
organic fraction: 5.39% by weight (containing about 80% by weight of residues of 2-ethylhexanoic acid).

The preparation yield of Ti with respect to the Ti initially introduced is 95% by weight. The other metals in the solid precipitate thus obtained are present in the following molar proportions with respect to the Ti:

$Ti_1Mg_{8.08}Hf_{1.25}Al_{1.71}Cl_{28.77}Zr_{0.04}$

The small quantity of Zr found analytically derives from impurities contained in the compound HfCl₄ used as reagent.

1.015 grams of the solid precipitate are suspended in 50 ml of anhydrous n-decane in a graded tailed test-tube, under a nitrogen flow. 1 ml of a solution at 0.31 M of diisopropyldimethoxysilane in n-decane (55 mg of siloxane compound, equal to 0.31 mmoles) are added to the suspension thus formed, with a Si/Ti atomic ratio equal to 0.5. The mixture is kept under stirring for 30 minutes at room temperature. The titre in titanium is determined on a 5 ml aliquot of the dried suspension, using the elemental analysis method described above. The suspension of the catalyst precursor thus obtained (according to the present invention), having a concentration of Ti equal to 0.59 g/l, is used as such in the subsequent polymerization tests.

Example 2

50 ml of anhydrous n-decane and 1.565 grams of the solid precipitate obtained as described in the previous Example 1, are charged into a tailed test-tube, under a nitrogen flow. 0.77 ml of a solution at 0.31 M of diisopropyldimethoxysilane in n-decane (equal to 42.3 mg, 0.24 mmoles of siloxane compound), are added to the suspension thus formed, with a Si/Ti atomic ratio equal to 0.25. The mixture is kept under stirring for 30 minutes at room temperature. The suspension of the catalyst precursor thus obtained (according to the invention), having a concentration of Ti equal to 0.91 g/l, is used as such in the subsequent polymerization tests.

Example 3

The following products are charged in order into a 10 l Borosilicate glass reactor containing 2 l of n-decane: 32 g (336 mmoles) of $MgCl_2$, 9.6 g (9.7 ml, 28.2 mmoles) of $Ti(n\text{-}OBu)_4$ and 12.91 g (40.3 mmoles) of $HfCl_4$.

162.79 g (1129 mmoles, 179.7 ml) of 2-ethylhexanoic acid (EEA), equal to a molar ratio EEA/(Mg+Hf)=3, are subsequently added, at room temperature, slowly and under stirring.

The suspension thus obtained is heated to 90° C. and maintained at this temperature for 30 minutes in a closed vessel. A slightly opalescent light yellow-green-coloured solution is obtained, which is then filtered under heat on a filtering septum, leaving a residue of 6.9 g (72.5 mmoles) of $MgCl_2$ equal to 21.6% of the initial $MgCl_2$. A solution of 288.7 g (1.862 mmoles) of isobutylaluminium dichloride in 950 ml of n-decane is added dropwise and under vigorous stirring, to the limpid solution thus obtained, cooled to room temperature. The addition phase of IBADIC lasts about 2 hours and the temperature is maintained at values ranging from 30 to 40° C. The ratio between the chlorine atoms in the isobutylaluminium dichloride and the alkoxide and carboxylic groups initially introduced is equal to 3.

The reaction mixture thus formed is heated to 80° C. and kept at this temperature for 2 hours. The solid precipitate in suspension thus obtained is separated from the mother liquor by decanting. The suspension is left to rest for about 30 minutes and the overlying clear liquor is separated. A volume of 3 liters of fresh n-decane is then added, stirring the mixture until a homogeneously dispersed suspension is re-formed. A second decanting is then effected after a rest time of about 60 minutes. The precipitate is subsequently filtered, washed with three aliquots, each of 2 l, of n-hexane, and dried under vacuum at room temperature. The concentration of IBADIC in the mother liquor at the third washing was lower than 0.5 mmoles/liter.

42.65 grams of solid precipitate (PREP-2) are obtained, having the following composition (weight % with respect to the total weight of the solid):
titanium: 3.04% by weight
magnesium: 12.9% by weight
hafnium: 15.70% by weight
aluminium: 2.88% by weight
chlorine: 61.18% by weight
zirconium: 0.3% by weight
organic fraction: 4.00% by weight (containing about 80% by weight of residues of 2-ethylhexanoic acid).

The synthesis yield of Ti with respect to the Ti initially introduced is 96% by weight. The other metals in the solid precipitate thus obtained are present in the following molar proportions with respect to the Ti:

The small quantity of Zr found analytically derives from impurities contained in the compound $HfCl_4$ used as reagent.

The granulometric analysis effected on a portion of the solid precipitate showed an average dimension of the granules of 5.1 μm, and a distribution which is such that 80% by weight of the granules has a dimension ranging from 2.5 to 13.1

1.355 grams of said solid residue PREP-2 in 50 ml of anhydrous n-decane are charged into a graded tailed test-tube, under a nitrogen flow. 1.39 ml of a solution at 0.31 M of diisopropyldimethoxysilane in n-decane (equal to 76 mg, 0.43 mmoles, of siloxane compound) are added to the suspension thus formed, with a Si/Ti atomic ratio equal to 0.5. The mixture is left under stirring for 30 minutes at room temperature.

The suspension of the catalyst precursor (according to the present invention) thus obtained, having a concentration of Ti equal to 0.8 g/l, is used as such in the subsequent polymerization tests.

Example 4

Solid catalyst precursor obtained by means of two consecutive treatments with siloxane (according to the invention).

50 ml of anhydrous n-decane and 1.184 grams of the solid precipitate PREP-1, obtained as described in the previous example 1, are charged into a tailed test-tube, under a nitrogen flow. 1.20 ml of a solution at 0.31 M of diisopropyldimethoxysilane in n-decane (for 66 mg of siloxane compound, equal to 0.37 mmoles) are added to the suspension thus formed, with a Si/Ti atomic ratio equal to 0.5. The mixture is left under stirring for about 30 minutes, and a further 1.20 ml of the solution of diisopropyldimethoxysilane in n-decane (for a further 66 mg of siloxane) are added again, with a final overall ratio between silicon atoms and titanium atoms equal to 1.0. The reaction mixture is kept under stirring for a further 30 minutes at room temperature. The suspension of the catalyst precursor (according to the invention) thus obtained contains 0.66 g/l of Ti and is used as such in the subsequent polymerization tests.

Example 5

The preparation with two consecutive treatments of siloxane compound A according to the previous Example 4, is repeated, but using 1.05 grams of the solid precipitate PREP-2, obtained as described in the previous example 3. The suspension of the catalyst precursor (according to the invention) thus obtained contains 0.61 g/l of Ti and is used as such in the subsequent polymerization tests.

Example 6

Copolymerization of Ethylene and 1-hexene to LLDPE in an Adiabatic Batch Reactor A vacuum-nitrogen flushing is exerted for at least three times and for an overall duration of about 2 hours in a 5-liter steel autoclave, of the Brignole type, equipped with a pressurized burette for the addition of the catalyst, a propeller stirrer and a heating thermoresistance connected to a thermostat for the temperature control. The following products are introduced in order into the autoclave: 2 l of anhydrous n-decane, 60 ml (40 g, 0.476 moles) 1-hexene, 1.0 ml of a solution at 1M of TIBAL (1.0 mmoles) in n-decane as cocatalyst. The temperature inside the reactor is brought to 209.4° C. and the reactor is pressurized with ethylene until a stable pressure of 14.5 MPa is reached at equilibrium. Under these conditions, a total of 46.3 g of ethylene are charged into the autoclave, subdivided into gaseous phase and ethylene dissolved in n-decane, as can be calculated on the basis of the known physico-chemical parameters of the system.

2.55 ml of the suspension of solid catalyst precursor obtained according to the previous Example 1, corresponding to 1.5 mg (0.0313 mmoles) of titanium (atomic ratio Al$_{TIBAL}$/Ti=32), are collected and introduced into the pressurized burette together with about 5 ml of decane. The precursor suspension is charged into the autoclave, applying a slight overpressure of ethylene.

The heating of the thermoresistance is interrupted and a temperature increase is observed due to the exothermicity of the polymerization reaction under pseudoadiabatic conditions, i.e. without removing the heat produced by the polymerization with cooling means. The entity of the temperature variation (ΔT) can be directly correlated to the quantity of ethylene polymerized and is proportional to the catalytic activity obtained. The polymerization is continued for 5 minutes, without feeding further ethylene, and the reaction is then interrupted by the introduction of about 20 ml of ethanol into the autoclave. It is observed that the temperature reaches a peak of 217.8° C., with a ΔT equal to 8.4° C., then dropping to 217.6° C. when the reaction is interrupted, with a pressure reduced to 4.8 MPa. On the basis of these data, a production of 45 g of ethylene copolymer (LLDPE polyethylene) can be calculated, equal to a conversion of 97% of the ethylene initially introduced. Under the above-mentioned adiabatic process conditions, an activity of 30 kg of polyethylene per gram of Ti, is obtained.

The mixture is left to cool and the contents of the reactor are then discharged into about 3 liters of ethanol. The polymer is separated by filtration, washed with acetone and dried in an oven under vacuum (about 100 Pa) at 90° C. for about 12 hours. The dried polymer is analyzed to determine the molecular weights, the Melt Flow Index and density, according to the methods previously indicated.

The polyethylene thus obtained has the following properties: melt flow index (2.16 Kg)=0.34 dg/min; shear sensitivity (SS)=32.5; density=0.919 g/ml; Mn=43,000 D; Mw=186,100 D; Mw/Mn=4.33

The results are schematically summarized in Table 1 below.

Examples 7 to 10 and Comparative Example 11

Some copolymerization tests were carried out under similar conditions to those previously specified in Example 5, but using each time the catalysts prepared according to the previous examples 1 to 4 and varying the quantity of 1-hexene. A polymerization test was also effected for comparative purposes with respect to Example 6, using, as solid catalyst component, the solid precipitate PREP-1, obtained as intermediate in the preparation of the catalyst precursor according to Example 1.

The reaction conditions and results of each test are indicated in Table 1. The characterizations of the copolymers obtained are indicated in Table 2.

Examples 12 And 13 and Comparative Examples 14 and 15

Two copolymerization tests were carried out with analogous procedures to those specified in the previous examples 6 and 7 and comparative example 11, but using 1-octene as comonomer instead of 1-hexene. The reaction conditions and results obtained are indicated in Table 1. The characterizations of the copolymers are indicated in Table 2.

Examples 16 And 17 and Comparative Example 18

Some copolymerization tests were carried out with 1-hexene with analogous procedures to those specified in the previous examples, but using the catalyst precursors obtained on an industrial scale according to the previous examples 3 and 5. The reaction conditions and results obtained are indicated in Table 1. The characterizations of the copolymers are indicated in Table 2.

Table Legend

Table 1 indicates, for each example, whose number is specified in the first column on the left, in order: the preparation example of the solid catalyst precursor; the quantity of Ti contained in the solid precursor introduced into the reactor, in the column "Ti"; the quantity in grams of 1-hexene or 1-octene introduced into the reactor, in the column "alpha-olefin"; the quantity of ethylene charged into the reactor, in the column "ethylene"; the initial reaction temperature in the column "T$_{in}$"; the increase in temperature observed during the polymerization, in the column ΔT; the quantity of polymer obtained, in the column "Yield"; the percentage conversion, expressed as a ratio between the grams of polyethylene produced with respect to the total grams of ethylene present in the polymerization reactor, in the column "Conversion"; the activity of the catalyst expressed in kilograms of polymer per gram of Ti in the column "Activity".

Table 2 indicates, for each example, whose number is specified in the first column on the left, in order: the Melt Flow Index M.F.I. with a weight of 2.16 kg in the column "MFI"; the shear sensitivity SS, the density of the polymer obtained, the number average molecular weights M$_n$ and weight average molecular weights M$_w$ and the dispersion index M$_w$/M$_n$. Finally, the column of the activities obtained in each example, already indicated in Table 1, is repeated.

From a comparison of the results in Tables 1 and 2 the increase in the average molecular weight M$_W$ together with the improved (lower) melt flow index, is evident, whereas the overall activity of the catalyst is substantially the same as that of the solid precipitate not treated with the siloxane compound. These results are an evident indication of a greater thermal stability of the active polymerization sites in the catalyst according to the present invention.

TABLE 1

Ethylene/1-hexene and ethylene/1-octene copolymerization; TIBAL co-catalyst; P$_{ethylene}$ about 1.5 MPa, time = 5 minutes; Al$_{TIBAL}$/Ti = 32

| Polymer. Ex. | Precursor Ex. Nr | Ti (mg) | Type | alpha-olefin Quantity (g) | Ethylene calc. (g) | T$_{in}$ (° C.) | ΔT (° C.) | Yield PE (g) | Activity (kg$_{PE}$/g$_{Ti}$) |
|---|---|---|---|---|---|---|---|---|---|
| 6 | 1 | 1.5 | 1-hexene | 40 | 46.3 | 209.4 | 8.4 | 45.0 | 30.00 |
| 7 | 1 | 1.5 | 1- hexene | 100 | 46.3 | 209.4 | 7.7 | 45.4 | 30.26 |
| 8 | 2 | 1.5 | 1- hexene | 40 | 49.1 | 209.7 | 10.4 | 48.5 | 32.33 |
| 9 | 2 | 1.5 | 1 hexene | 100 | 50.3 | 209.5 | 8.8 | 49.1 | 32.73 |
| 10 | 4 | 1.5 | 1- hexene | 40 | 48.1 | 209.9 | 9.0 | 47.4 | 31.58 |
| 11(Comp) | PREP-1 | 1.5 | 1- hexene | 40 | 50.4 | 208.7 | 8.9 | 49.9 | 33.3 |

TABLE 1-continued

Ethylene/1-hexene and ethylene/1-octene copolymerization; TIBAL co-catalyst;
$P_{ethylene}$ about 1.5 MPa, time = 5 minutes; $Al_{TIBAL}/Ti = 32$

| Polymer. Ex. | Precursor Ex. Nr | Ti (mg) | alpha-olefin Type | Quantity (g) | Ethylene calc. (g) | $T_{in}$ (° C.) | $\Delta T$ (° C.) | Yield PE (g) | Activity ($kg_{PE}/g_{Ti}$) |
|---|---|---|---|---|---|---|---|---|---|
| 12 | 1 | 1.5 | 1-octene | 40 | 49.8 | 211.0 | 10.4 | 49.0 | 32.66 |
| 13 | 1 | 1.5 | 1-octene | 100 | 50.1 | 210.1 | 11.4 | 49.9 | 33.3 |
| 14(Comp) | PREP-1 | 1.5 | 1-octene | 40 | 52.4 | 210.4 | 11.5 | 52.2 | 34.78 |
| 15(Comp) | PREP-1 | 1.5 | 1-octene | 100 | 57.1 | 210.2 | 10.5 | 56.3 | 37.53 |
| 16 | 3 | 1.75 | 1- hexene | 50 | 44.7 | 205.2 | 8.2 | 42.99 | 24.57 |
| 17 | 5 | 1.75 | 1- hexene | 50 | 47.8 | 207.5 | 8.6 | 45.99 | 26.28 |
| 18(Comp) | PREP-2 | 1.75 | 1- hexene | 40 | 46.9 | 200.1 | 9.3 | 46.0 | 26.3 |

TABLE 2

Characteristics of the copolymers

| Example | Activity ($kg_{PE}/g_{Ti}$) | MFI | SS | Density | $M_n$ | $M_w$ | $M_w/M_n$ |
|---|---|---|---|---|---|---|---|
| 6 | 30.00 | 0.34 | 32.53 | 0.919 | 43000 | 186100 | 4.33 |
| 7 | 30.26 | 0.54 | 31.08 | 0.906 | 39900 | 157800 | 3.95 |
| 8 | 32.33 | 0.37 | 33.51 | 0.919 | 44100 | 171000 | 3.88 |
| 9 | 32.73 | 0.78 | 31.67 | 0.903 | 41300 | 146400 | 3.54 |
| 10 | 31.58 | 0.22 | 30.43 | 0.920 | 39800 | 183700 | 4.62 |
| 11 (Comp) | 33.3 | 0.84 | 32.17 | 0.914 | 39700 | 136100 | 3.43 |
| 12 | 32.66 | 0.39 | 31.6 | 0.913 | 42600 | 180000 | 4.23 |
| 13 | 33.3 | 0.84 | 35.8 | 0.900 | 40300 | 138600 | 3.44 |
| 14 (Comp) | 34.78 | 0.59 | 32.05 | 0.919 | 36700 | 155000 | 4.22 |
| 15 (Comp) | 37.53 | 0.95 | 33.76 | 0.905 | 37900 | 133000 | 3.51 |
| 16 | 24.57 | 0.65 | 33.5 | 0.924 | 33089 | 144600 | 4.37 |
| 17 | 26.28 | 0.70 | 30.9 | 0.925 | 35037 | 143300 | 4.09 |
| 18 (Comp) | 26.3 | 0.73 | 32.2 | 0.926 | 31570 | 130700 | 4.14 |

The invention claimed is:

1. A catalyst precursor for the (co)polymerization of alpha-olefins, comprising titanium, magnesium, aluminum, chlorine and at least one metal M selected from hafnium and zirconium characterized in that it is obtained by means of a process comprising the following steps:
(i) heating a mixture in a liquid hydrocarbon solvent comprising a magnesium chloride, a compound of titanium, a compound of said metal M, a carboxylic acid R—COOH, wherein R is an organic group having from 2 to 30 carbon atoms, in such quantities as to respect the following atomic or molar ratio ranges:
M/Ti=0.2-5.0; Mg/Ti=3.0-20.0; R—COOH/(Mg+M)=1-8
at a temperature ranging from 50 to 200° C. for at least one minute and separating the possible solid residue remaining undissolved, to obtain a solution;
(ii) adding to the solution obtained in step (i), an aluminum alkyl chloride having the following general formula (I):

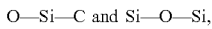 (I)

wherein: R' is a linear or branched alkyl radical, containing from 1 to 20 carbon atoms, and "n" is a decimal number having values ranging from 0.5 to 2.5,
in an amount sufficient for precipitating in the form of a solid compound at least 70% of the metals Mg, M and Ti present in said solution, and heating the mixture thus obtained to a temperature ranging from 40 to 130° C. for a time ranging from 5 to 240 minutes to obtain a solid precipitate comprising Mg, M, Al and Cl in atomic ratios with respect to the Ti within the following ranges:

M/Ti=0.2-5.0; Mg/Ti=3.0-15.0; Al/Ti=0.1-4.0; Cl/Ti=15.0-60.0;
(iii) separating the solid precipitate thus formed from the residual liquid solution; and
(iv) putting said solid precipitate obtained in step (iii) in contact with a siloxane compound A, having from 2 to 40 carbon atoms and from 1 to 15 silicon atoms, comprising at least one siloxane group selected from the following formulae:

in such an amount that the atomic ratio Si/Ti between the Si atoms in the siloxane compound A and the Ti atoms in the solid precipitate, is higher than or equal to 0.1 to obtain said catalyst precursor.

2. The catalyst precursor according to claim 1, characterized in that at the end of step (iv) it is obtained in the form of a suspension in a liquid hydrocarbon that optionally contains an excess amount of siloxane compound A.

3. The catalyst precursor according to claim 1, wherein titanium, magnesium, said metal M, aluminum and chlorine form at least 80% by weight of the catalyst.

4. The catalyst precursor according to claim 1, having a particle-size with a Gaussian distribution having a maximum ranging from 2 to 15 μm, and granule dimensions which are such that 80% by weight of the same ranges from 1 to 30 μm.

5. The catalyst precursor according to claim 1, wherein the titanium is in an amount of up to 10% by weight with respect to the total weight of the solid.

6. The catalyst precursor according to claim 1, wherein in step (i) of the preparation process, the molar ratio RCOOH/(Mg+M) ranges from 1.5 to 5.0.

7. The catalyst precursor according to claim 1, wherein in step (i) of the preparation process, the solid residue remaining undissolved is equal to or lower than 30% by weight with respect to the total weight of the metallic compounds of the mixture which are insoluble as such in the liquid hydrocarbon solvent at room temperature.

8. The catalyst precursor according to claim 1, wherein in step (i) of the preparation process, the heating of the mixture is effected in a closed container or under reflux conditions of the solvent.

9. The catalyst precursor according to claim 1, wherein in said preparation step (ii), the addition of the aluminum alkyl chloride having formula (I) to the solution obtained in step (i) is effected so that the temperature of the reaction mixture is not higher than 45° C.

10. The catalyst precursor according to claim 1, wherein at the end of the separation step (iii), the solid precipitate is subjected to washings with a hydrocarbon solvent until a molar concentration of aluminum in the hydrocarbon solvent lower than 1.5 mM, is reached.

11. The catalyst precursor according to claim 1, wherein said step (iv) is carried out at a temperature ranging from −10 to 120° C.

12. The catalyst precursor according to claim 1, wherein said siloxane compound A, in the preparation step (iv), comprises from 1 to 10 O atoms.

13. The catalyst precursor according to claim 1, wherein said siloxane compound A, in the preparation step (iv), is selected from those included in the following formulae (II) and (III):

$$SiR'''_p(OR'')_{(4-p)} \quad (II)$$

$$T_1(Si(R^5)_2-O-)_q T_2 \quad (III)$$

wherein
each R" is independently a linear, cyclic or branched alkyl group, having from 1 to 10 carbon atoms, possibly halogenated or an aryl group having from 6 to 10 carbon atoms, possibly halogenated, or an alkyl silyl group having the formula —SiR'''$_3$;
each R'" is independently H, a halogen or an alkyl or aryl group included in the definition of the previous R";
each $R^5$ is independently H, a halogen, preferably chlorine, or an alkyl or aryl group included in the definition of the previous R", or an alkoxyl or aryloxy groups having the formula —OR", wherein R" is as previously defined,
$T_1$ can have any of the meanings of $R^5$;
$T_2$ can have any of the meanings of R";
p is an integer ranging from 0 to 3;
q is an integer ranging from 2 to 15.

14. A catalyst for the (co)polymerization of alpha-olefins, comprising, in contact with each other, a cocatalyst consisting of a hydride or organometallic compound of a metal of groups 1, 2 or 13 of the periodic table, and a catalyst precursor according to claim 1.

15. The catalyst according to claim 14, wherein said cocatalyst is selected from aluminum trialkyls which contain from 1 to 10 carbon atoms in each alkyl radical.

16. The catalyst according to claim 15, wherein the atomic ratio between the aluminum (in the cocatalyst) and the titanium (in the precursor) is within the range of 1:1 to 500:1.

17. A process for the (co)polymerization of alpha-olefins, comprising polymerizing at least one alpha-olefin, either in continuous or batchwise, in one or more steps at low (0.1 -1.0 MPa), medium (1.0 -10 MPa) or high (10-150 MPa) pressure, at temperatures ranging from 20 to 300° C. in the presence of a catalyst according to claim 14.

18. The process according to claim 17, wherein at least one alpha-olefin is ethylene.

19. The (co)polymerization process according to claim 17, characterized in that it is carried out in an inert solvent solution, at temperatures ranging from 130 to 300° C. and at pressures ranging from 1 to 25 MPa.

20. The (co)polymerization process according to claim 19, wherein the polymerization temperature ranges from 160 to 260° C.

21. The process according to claim 17, wherein the process is carried out in an inert solvent.

* * * * *